(12) United States Patent
Anazawa et al.

(10) Patent No.: US 6,884,404 B2
(45) Date of Patent: Apr. 26, 2005

(54) METHOD OF MANUFACTURING CARBON NANOTUBES AND/OR FULLERENES, AND MANUFACTURING APPARATUS FOR THE SAME

(75) Inventors: Kazunori Anazawa, Minamiashigara (JP); Kei Shimotani, Minamiashigara (JP); Hiroyuki Watanabe, Minamiashigara (JP); Masaaki Shimizu, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 131 days.

(21) Appl. No.: 09/863,291

(22) Filed: May 24, 2001

(65) Prior Publication Data

US 2001/0050219 A1 Dec. 13, 2001

(30) Foreign Application Priority Data

May 31, 2000 (JP) ...................................... 2000-163489

(51) Int. Cl.$^7$ ................................................ D01F 9/12
(52) U.S. Cl. ................................ 423/447.1; 423/447.3; 204/157.4; 204/157.47; 204/173
(58) Field of Search ......................... 423/445 B, 445 R, 423/447.3, 447.1, 445; 204/157.4, 157.47, 173

(56) References Cited

U.S. PATENT DOCUMENTS

| | | | | |
|---|---|---|---|---|
| 5,227,038 A | * | 7/1993 | Smalley et al. | ............. 204/173 |
| 5,424,054 A | * | 6/1995 | Bethune et al. | .......... 423/447.2 |
| 5,876,684 A | * | 3/1999 | Withers et al. | ......... 423/445 B |
| 6,063,243 A | * | 5/2000 | Zettl et al. | .................. 204/164 |

FOREIGN PATENT DOCUMENTS

JP 11116218 * 4/1999

OTHER PUBLICATIONS

Ebbesen, Thomas. "Carbon Nanotubes: Preparation and Properties", 1997, CRC Press, pp. 151–153.*
Shimotani et al: *Applied Physics A*, 73: 451–454 (2001).
Journet et al., "Large–scale production of single–walled carbon nanotubes by the electric–arc technique", Nature, vol., 388 Aug. 21, 1997.

* cited by examiner

*Primary Examiner*—Stuart L. Hendrickson
*Assistant Examiner*—Peter J Lish
(74) *Attorney, Agent, or Firm*—Oliff & Berridge, PLC

(57) ABSTRACT

The method of manufacturing carbon nanotubes and/or fullerenes reduces the pressure inside a system to 1.3 Pa or lower, supplies a carboniferous liquid state material to raise the pressure inside the system to at least 1.3 kPa to 93.3 kPa, generates arc discharges, supplies the carboniferous liquid state material in discharge plasma created by the arc discharges, and disintegrates or excites the carboniferous liquid state material, thereby producing the carbon nanotubes and/or the fullerenes. And, the manufacturing apparatus is equipped with at least a pair of electrodes that generate arc discharges into a vacuum chamber to create discharge plasma, a gas supply unit capable of supplying a carrier gas into the vacuum chamber, and a raw material supply unit capable of supplying a carboniferous liquid state material in the discharge plasma through an introduction tube. Thus, the invention provides the manufacturing method and manufacturing apparatus that allow continuous production of high purity carbon nanotubes and/or fullerenes with high production efficiency.

15 Claims, 2 Drawing Sheets

METHOD OF MANUFACTURING CARBON NANOTUBES AND/OR FULLERENES, AND MANUFACTURING APPARATUS FOR THE SAME

BACKGROUND OF THE INVENTION

1. Field of the Invention

The present invention relates to a method of manufacturing carbon nanotubes and/or fullerenes, and an apparatus for manufacturing the same.

2. Description of the Related Art

The fullerene represented by $C_{60}$ discovered in 1985 and the carbon nanotube discovered in 1991 have been attracting considerable attention as a new allotrope of carbon that is different from graphite, amorphous carbon, and diamond, because they display a unique electronic material physics different from what the existing carbon material exhibits.

The fullerene represented by $C_{60}$ or $C_{70}$ includes great many kinds other than these, in which multiple carbon atoms are arrayed in a spherical basket to form a molecule. Further, the fullerene is easy to handle since it is soluble to an organic solvent such as benzene. In addition to the property as a superconductor or a semiconductor, it also exhibits a highly photosensitive effect, which leads to possible application as an electrophotographic sensitized material. Furthermore, a physical property that constitutes a functional material emerges by doping dissimilar elements into the fullerene, or by giving multiple chemical functional groups on the outside thereof.

On the other hand, the carbon nanotube (hereunder, simply referred to as 'nanotube'), being a new material made up of carbon only in the same manner as the fullerene, is discovered to possess the photosensitive effect and a function as a semiconductor and the like, and is expected to be utilized in various fields of the electronics industry. Especially, since it can be made into a semiconductor or even a conductor by a slight change in the atomic arrangement (chirality), the nanotube also attracts strong expectations as an electro conductive material and/or a switching element having an infinitesimal dimension of nanometer. It also attracts attention as an electron source of the field emission type and/or a hydrogen-absorbing material, and in addition it has been tested for use as a probe for the tunnel electron microscope or a probe for the interatomic force microscope.

Conventionally, the fullerenes and the nanotubes have been manufactured by means of the laser ablation method, the chemical vapor deposition (CVD) method using an acetylene gas, and the arc discharge method using carbon rod electrodes as a raw material, and the like. The scientific grounds on which the fullerenes and the nanotubes can be manufactured by the arc discharge method, the laser ablation method, or the like are still unknown today.

With regard to production of the fullerenes and the nanotubes, various methods for mass synthesis have been examined. The resistance heating method, which was devised at the beginning, brings the tips of two graphite rods into contact in a rare gas, carries currents of some ten amperes to some hundred amperes through the rods, and thereby heats the graphite to make it evaporate. However, this method is extremely difficult to acquire a sample of few grams, and it is rarely used now.

The laser ablation method applies a pulsed laser such as a YAG laser to a graphite sample, and thereby generates plasma on the surface of the graphite to produce soot. Compared with the arc discharge method described later, this method has an advantage in producing the $C_{60}$ fullerene with high efficiency, and in producing the nanotube and the fullerene with high purity.

The chemical vapor deposition method employs an acetylene gas or a methane gas as a raw material, and produces the nanotube and fullerene with high purity by means of the chemical decomposition reaction of the ingredient gas. Recently, a method of manufacturing the nanotube with high efficiency has been discovered by applying electron beams and the like to a fluorine compound with a chemical treatment applied.

It is possible to produce a high-purity nanotube, because the chemical reaction in the chemical vapor deposition method depends upon the thermal decomposition process of the raw material. Because the raw material is gas, it is also possible to continuously input the raw material. However, since chemical reaction in the chemical vapor deposition method is the thermal equilibrium reaction, the growth rate is extremely slow, which is disadvantageous. The chemical vapor deposition method using the fluorine compound as the raw material exhibits high manufacturing efficiency, and the technique thereof is effective in manufacturing a multi-walled nanotube; however, it is unfit for manufacturing a single-walled nanotube, which is promising as an electronic element.

The arc discharge method employs two graphite rods for the cathode and the anode, which are disposed in the manufacturing apparatus containing a rare gas such as a helium or argon gas, and applies some ten volts between both the electrodes to carry currents of some ten amperes. Thereby, the method generates arc discharges, resulting in raising the temperature of the anode tip up to about 4000° C., which vaporizes the anode tip to deposit soot containing nanotubes and fullerenes on the cathode and on the wall inside the apparatus. The soot contains the nanotubes and the fullerenes by some percentage. The soot containing the fullerenes is dissolved in an organic solvent such as benzene, and the fullerenes are separated and refined from the soot by the liquid chromatography method. Since the molecule size of the nanotube is quite large, there does not exist a soluble organic solvent; and the nanotubes are separated and refined from the soot by the ultrasonic method or the heat treatment method. To contain nickel compounds or iron compounds in the anode effects the catalytic action, which allows production of single-walled nanotubes efficiently.

In the foregoing arc discharge method, when the graphite rods are used for the electrodes, electrons and ions that exist in abundance in the arc plasma collide with the graphite rod of the anode. As the result, the temperature of the tip of the graphite rod rises to about 4000° C., ions and neutral particles of carbon are emitted in abundance. It is considered that the fullerenes and nanotubes are produced through the processes that deposit these ions and neutral particles on the cathode and on the inner wall of the chamber, and further deposit again on the anode. However, in the arc plasma, multifariously complicated chemical reactions are produced by collisions with excited ions and electrons, and it is difficult to stably control the quantity and kinetic energy of the carbon ions. Consequently, the method produces abundant amorphous carbon particles and graphite particles together with the fullerenes and the nanotubes, which turn into soot with these mixed. Moreover, the concentration of the nanotubes and that of the fullerenes in the soot are extremely low, which are as low as several percent.

Accordingly, to separate and refine the nanotubes and fullerenes from the soot will only produce an infinitesimal quantity of nanotubes and fullerenes. The fullerenes are soluble in an organic solvent such as benzene, which makes it possible to refine them with high purity. However, to separate and refine the nanotubes by the chemical treatment or by the ultrasonic vibration technique will not allow complete removal of the amorphous carbon and graphite particles, and the nanotubes cannot be separated with a high concentration. Thus, the conventional arc discharge method produces an extremely limited quantity of the nanotubes and the fullerenes in a single production lot, remarkably lowering the production efficiency. From these circumstances, a method of a mass production of the carbon nanotubes and the fullerenes is eagerly sought for.

In general, when the carbon nanotubes and the fullerenes are manufactured by the arc discharge method, graphite is used as the electrodes, and the electrodes generate plasma that contains the carbon group such as C and $C_2$ by the arc discharge. This carbon group is clearly a source of the fullerenes and/or the carbon nanotubes. Therefore, in order to mass-synthesize the carbon nanotubes and the fullerenes, a mass supply of this source is expected to produce carbon materials with a quantity corresponding to the supply. However, since the supply of the source is carried out only by the electrodes themselves in the conventional technique, the anode electrode is shortened as the discharge time is extended. To mass-synthesize them will require supply of the graphite electrodes stably and continuously, and to build up such an apparatus will inevitably lead to a complicated mechanism or a large-sized apparatus.

This condition is the same as in the laser ablation method that uses graphite as the target. The laser ablation method will bring about a slightly higher content of percentage of the nanotubes and the fullerenes, but it is difficult to mass-synthesize the soot in the same manner as the arc discharge method.

Therefore, in the conventional method, the production efficiency is low and the purities of the nanotubes and the fullerenes contained in the acquired soot are low, which is disadvantageous. Especially, in order to efficiently produce the nanotubes expected as a material to achieve an electronic switching element having a dimension within some nanometers, it is required to implement an industrial manufacturing method that allows production of high-purity nanotubes in large quantities, and a manufacturing apparatus for the same. Journet C., et a)., "Large-scale production of single-walled carbon nanotubes by the electric-arc technique," Nature, Vol. 338, p756 (Aug. 21, 1997), discloses that carbon in mass of total two grams is attained in tow minutes of synthesizing time, in a large-scale synthesis technique of single walled carbon nanotubes.

SUMMARY OF THE INVENTION

The present invention has been made in view of the above circumstances and provides a manufacturing method that permits a high-efficiency and continuous production of high-purity nanotubes and fullerenes, with low-impurity concentrations of amorphous carbon and graphite particles.

The inventors discovered, as a result of concentrated research, to attain high-purity nanotubes and fullerenes with a high yield when using a carboniferous liquid state material as the carbon source and employing an apparatus that supplies the carboniferous liquid state material in discharge plasma, and accomplished the invention.

According to one aspect of the invention, the method of manufacturing carbon nanotubes and/or fullerenes includes the steps of: reducing the pressure inside a system to 1.3 Pa or lower; supplying a carboniferous liquid state material to raise the pressure inside the system to at least 1.3 kPa to 93.3 kPa; generating arc discharges; supplying the carboniferous liquid state material in discharge plasma created by the arc discharges; and disintegrating or exciting the carboniferous liquid state material to produce the carbon nanotubes and/or the fullerenes.

According to another aspect of the invention, the apparatus that manufactures carbon nanotubes and/or fullerenes is equipped with at least a pair of electrodes that generate arc discharges into a vacuum chamber to create discharge plasma; a gas supply unit that supplies a carrier gas into the vacuum chamber; and a raw material supply unit that supplies a carboniferous liquid state material in the discharge plasma through an introduction tube.

BRIEF DESCRIPTION OF THE DRAWINGS

Preferred embodiments of the present invention will be described in detail based on the followings, wherein.

DETAILED DESCRIPTION OF THE PREFERRED EMBODIMENTS

Figure 1:
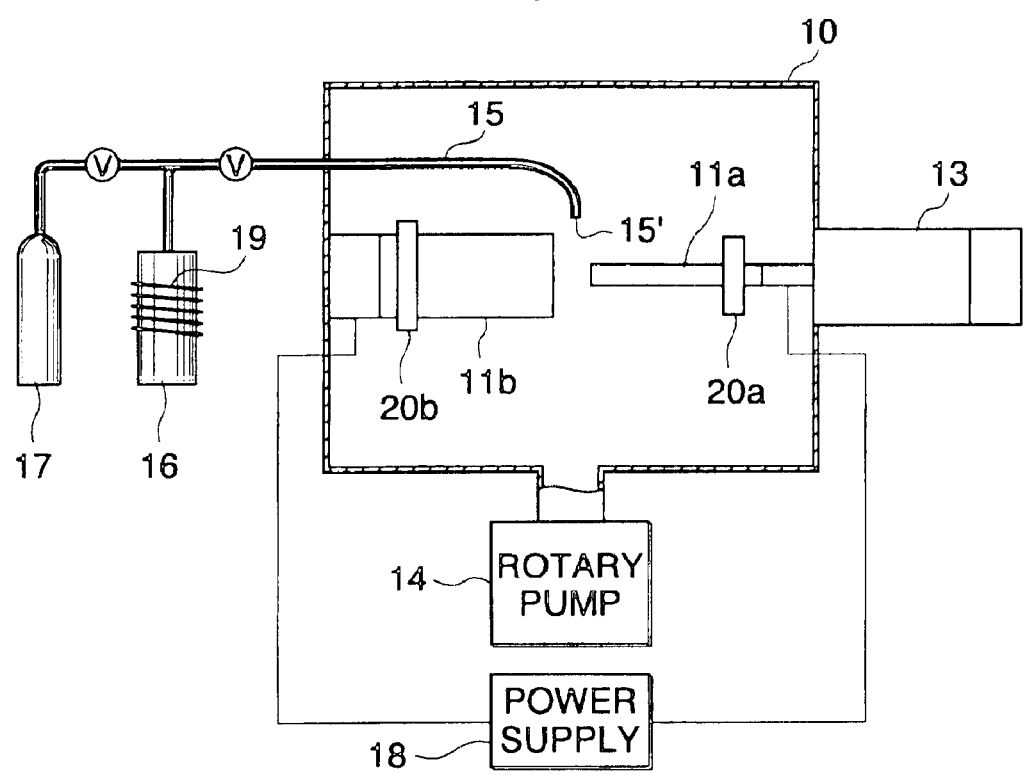
FIG. 1 is a schematic drawing illustrating one embodiment of the manufacturing apparatus according to the invention.

The method of manufacturing nanotubes and/or fullerenes according to the invention and the manufacturing apparatus used in the manufacturing method thereof will be described with reference to FIG. 1.

The manufacturing apparatus for carbon nanotubes and/or fullerenes of the invention includes at least a pair of electrodes 11a, 11b that generate arc discharges into a vacuum chamber 10 to create discharge plasma, a gas supply unit 17 that allows supply of a carrier gas into the vacuum chamber, and a raw material supply unit 16 including an introduction tube 15 that allows supply of a carboniferous liquid state material in the discharge plasma.

Preferably, the vacuum chamber 10 is made of a metal such as a stainless. In the vacuum chamber 10 are installed a rotary pump 14 that reduces the pressure inside the system and a pressure gauge (not illustrated) for measuring the pressure inside the system. The electrodes 11a and 11b installed inside the vacuum chamber 10 are connected to a power supply 18 to apply a DC or AC voltage. The electrodes 11a and 11b are disposed to face each other on the right and left in the drawing. The layout of the electrodes is not limited to this as long as stable creation of the discharge plasma is ensured.

It is preferable to use, as the electrode material, any of carbon, iron, copper, stainless, nickel, tungsten, tantalum, molybdenum, and the like; and in order to generate high-temperature arc discharges, it is further preferable to use carbon or tungsten of a high melting point. In case of using carbon as the electrodes, to contain a known catalyst such as nickel, yttrium, carbon particles, etc., in the electrodes will effect to stimulate production of single-walled nanotubes. In order to contain the catalyst in the electrodes, one feasible method is to fill the catalyst in holes of more than one bored on the electrodes, or to mix the catalyst in the electrodes during making the electrodes.

The electrodes 11a and 11b are preferably provided with cooling units 20a and 20b, respectively, for cooling them. In case of providing the cooling units, preferably a copper with a high thermal conductivity is used for the electrode material. To provide such a cooling unit will cool the electrode to stabilize the temperature thereof, which enables generation of stable arc discharges. The cooling unit may be provided to the anode (the electrode of a smaller diameter in case of the alternate current, the same hereunder), or to the cathode (the electrode of a larger diameter in case of the alternate current, the same hereunder), or to both of them. To provide the anode with the cooling unit will suppress overheating of the anode, and to provide the cathode will prevent graphitization of the nanotubes and fullerenes that are deposited. The cooling unit can take a cooling method of winding a water-cooling pipe made of copper or the like around the base material to support the electrode, or spraying a carrier gas to at least one electrode, or the like.

The power supply can take on either the direct current or the alternate current, however the diameters of the electrodes should be different, namely, the diameter of one electrode is preferably smaller than that of the other. Especially, in case of the direct current, the diameter of the anode is preferably smaller than that of the cathode. In FIG. 1, the electrode 11a is made in a smaller diameter than the electrode 11b. Also, to make parallel the faces of the electrodes 11a, 11b (discharge faces) allows generation of stable arc discharges, and further accelerates growth of the fullerenes in the vapor phase.

The electrode 11a is supported by a movable device (gap adjustment unit) 13. The movable device 13 allows moving the electrode 11a in the axial direction thereof, and facilitates to adjust the distance (electrode gap) between the electrodes 11a, 11b. Therefore, the movable device 13 is able to maintain the electrode gap at a constant value even if the electrode 11a is consumed while discharging. Here, in the drawing, the movable device 13 is placed on the side of the electrode 11a, however it may be placed on the side of the electrode 11b, or it may be placed on both sides of the electrodes 11a, 11b. However, the movable device 13 is preferably placed on the side of the electrode 11a, because, when the electrode 11a is consumed, the electrode gap can be adjusted without varying the position of the gap between the electrode 11a and 11b.

The manufacturing apparatus is provided with the introduction tube 15 that introduces a carboniferous liquid state material in the discharge plasma inside the vacuum chamber 10. A nozzle 15' of the introduction tube 15 to spray the carboniferous liquid state material is preferably disposed at the center of the electrode gap, which is as close to the generated discharge plasma as possible. This introduction tube 15 is used to supply the carboniferous liquid state material in the discharge plasma generated between the electrodes. The nozzle 15' of the introduction tube 15 sprays mist of the carboniferous liquid state material, effecting to supply the carboniferous liquid state material in the discharge plasma, which serves as the carbon source to produce fullerenes and nanotubes. Therefore, this manufacturing apparatus will enhance the yield of nanotubes and/or fullerenes better than that which is produced only between the carbon electrodes by the conventional apparatus.

The end opposite to the side of the nozzle 15' of the introduction tube 15 branches into the raw material supply unit 16 filled with the carboniferous liquid state material and the carrier gas cylinder 17. However, the carrier gas cylinder 17 may be connected to the vacuum chamber 10 by a separate line from the introduction tube 15. The raw material supply unit 16 may be provided with a heater 19. To provide the raw material supply unit 16 with the heater 19 will heat and vaporize the carboniferous liquid state material being the liquid raw material, and will introduce it into the chamber 10. By this construction, the carboniferous liquid state material can be supplied in the discharge plasma in a gas state with a high concentration, whereby the nanotubes and/or fullerenes can be produced efficiently.

The method of manufacturing carbon nanotubes and/or fullerenes according to the invention includes the steps of: reducing the pressure inside a system to 1.3 Pa or lower, supplying a carboniferous liquid state material to raise the pressure inside the system to at least 1.3 kPa to 93.3 kPa, generating arc discharges, supplying the carboniferous liquid state material in discharge plasma created by the arc discharges, and disintegrating or exciting the carboniferous liquid state material to produce the carbon nanotubes and/or the fullerenes.

With reference to FIG. 1, the method of manufacturing nanotubes and/or fullerenes according to the invention will be described hereunder, however the invention is not limited to these.

First, using the rotary pump 14, the atmospheric pressure inside the vacuum chamber 10 is reduced to 1.3 Pa ($10^{-2}$ Torr) or lower. Next, any of helium, argon, hydrogen, nitrogen, oxygen, and carbon dioxide as the carrier gas is introduced into the vacuum chamber 10 from the carrier gas cylinder 17 through the introduction tube 15, and the pressure inside the system is again reduced to 1.3 Pa ($10^{-2}$ Torr) or lower, so that the atmosphere does not remain inside the vacuum chamber 10. The steps of reducing the pressure, replacing the carrier gas, and reducing the pressure again are repeated plural times as needed.

From the raw material supply unit 16 filled with the carboniferous liquid state material, the carboniferous liquid state material is supplied, together with the carrier gas when required, into the vacuum chamber 10 through the introduction tube 15, until the pressure inside the system is raised to at least 1.3 kPa (10 Torr) to 93.3 kPa (700 Torr), preferably to 39.9 kPa (300 Torr) to 79.8 kPa (600 Torr), and the pressure is kept constant within such ranges during manufacturing.

As the carboniferous liquid state material, it is preferable to use an organic solvent, petroleum solvent, mineral oil, fatty acid ester, or the like.

As the organic solvent, preferable is one that is liquid at the ordinary temperature (15° C.) and is easy to evaporate under 150° C. Concretely, the followings can be listed: ketone group such as acetone; alcohol group such as methanol, ethanol, butanol, propanol; liquid state paraffin hydrocarbon group such as pentane, hexane, octane; aromatic hydrocarbon group such as benzene, chlorobenzene; ether group such as methyl ether, ethyl ether, tetrahydrofuran; and acetonitrile, chloroform, ethylene chloride, methylene chloride, methyl isobutyl ketone, methyl ethyl ketone, and so forth.

As the petroleum solvent, the followings can be listed: kerosene, gasoline, heavy oil, naphtha group, isopar group, etc.; as the mineral oil can be listed gear oil, turbine oil, machine oil, cutting oil, etc.; and as the fatty acid ester can be listed olive oil, coconut oil, salad oil, herring oil, etc.

Also, dissolving and/or dispersing iron compounds, nickel compounds, yttrium compounds, or the like into the carboniferous liquid state material as the catalyst will easily achieve production of single-walled nanotubes. Preferably are used ferrocene as the iron compounds, nickelocene as the nickel compounds, and yttrium nitride as the yttrium compounds.

After introducing the carboniferous liquid state material, the next step applies a voltage between the electrodes 11a, 11b to thereby generate arc discharges. To generate the arc discharges requires to apply an alternate or direct voltage between the electrodes and carry currents of 10 to 1000 A, preferably 20 to 100 A across the electrodes. To maintain stable arc discharges, an adjustment that varies the voltage or the electrode gap so as to make the current constant has to be done during the arc discharges. The voltage is 10 to 40 V, preferably 20 to 30 V. On the other hand, the electrode gap is 0.1 to 10 mm, preferably 1 to 5 mm.

Further, before generating the arc discharges, a contact arc processing may be carried out. The contact arc processing is a processing that generates the discharge plasma by bringing the electrodes into contact, applying the voltage, and detaching the electrode 11a from 11b by the movable device 13 until a specific electrode gap is created. This contact arc processing achieves stable discharge plasma easily and promptly.

The carboniferous liquid state material supplied in the discharge plasma is disintegrated or excited, and part of which is produced as the nanotubes and/or fullerenes on the electrode 11b or on the inner face of the vacuum chamber 10.

As mentioned above, the method of manufacturing nanotubes and/or fullerenes according to the invention involves the steps of supplying the carboniferous liquid state material in the arc discharge plasma through the introduction tube 15, preferably by spraying the same in mist, and accelerating the vapor phase epitaxy of the nanotubes and/or fullerenes. This method allows a continuous supply of the raw material, and a continuous production of the nanotubes and fullerenes.

Further, since the types of the liquid raw material are required to be the carboniferous liquid state material containing the carbon as mentioned above, this manufacturing method has a wide selection range of the raw material, which facilitates to improve the economical efficiency in the production and the environmental resistance. The method also enhances the purity of the produced nanotubes and/or fullerenes by reducing the impurity concentration of the raw material.

The apparatus for manufacturing nanotubes and/or fullerenes or the method of manufacturing the same according to the invention enables abundant introduction of the chemical compounds including carbon into the system, by using a carboniferous material in a liquid state and spraying it in the discharge plasma, which implements a very fast growth rate.

The manufacturing method of the invention allows a simultaneous production of nanotubes and fullerenes; however, controlling the pressure inside the system during arc discharges allows selection of manufacturing the nanotubes more in quantity or manufacturing the fullerenes more in reverse. That is, raising the pressure inside the system enables relatively increased production of the nanotubes and lowering the pressure enables increased production of the fullerenes in reverse.

EXAMPLES

The examples of the invention will be shown, however the invention is not to be limited to these examples.

Example 1

The example 1 employed the manufacturing apparatus shown in FIG. 1, and produced nanotubes and fullerenes, using acetone as the carboniferous material. The electrodes 11a and 11b employed graphite rods with the diameters of 5 mm and 15 mm, respectively. The power supply 18 adopted the alternate power supply.

The rotary pump 14 reduced the atmospheric pressure inside the vacuum chamber 10 to 1.3 Pa ($10^{-2}$ Torr) or lower, thereafter a helium gas was introduced into the vacuum chamber 10, and the gases inside the chamber were replaced by a helium gas. This process was repeated three times, and the pressure was reduced finally to 1.3 Pa. Next, acetone was supplied in the vacuum chamber 10 through the introduction tube 15, and the pressure during production was set to 66.5 kPa (500 Torr).

After generating arc discharges between the electrodes 11a and 11b by the contact arc processing, the movable device 13 detached the electrodes by about 2 mm. While supplying the carboniferous liquid state material, the pressure is maintained to 66.5 kPa to generate the arc discharges for 40 seconds, thereafter the pressure inside the chamber was reduced to the atmospheric pressure, and the carbon material deposited on the electrode was collected. Here, the applied voltage during the discharges was AC 200 Volts (frequency 50 Hz), and the current of 70 Amperes was observed. The supply rate of the carboniferous liquid state material during the arc discharges was set to 200 ml/min.

Figure 2:
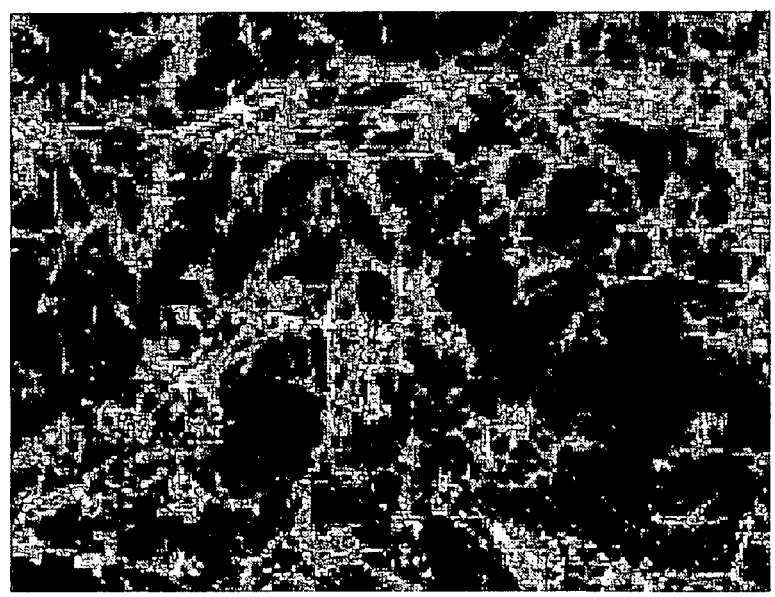
FIG. 2 is an SEM photograph of a carbon material that was attained by the embodiment.

The weight of the carbon material deposited on the electrode 11b (electrode of the diameter 15 mm) was 184 milligrams. FIG. 2 illustrates the observation of the produced carbon material by the SEM (scanning electron microscope, Hitachi S-4500).

The SEM photo (magnified 10000 times) in FIG. 2 confirmed that the nanotubes were produced in abundance with very few impurities. The estimated purity of the nanotubes in the carbon material, acquired from this SEM photo, was found to be 70% to 90%. The observation by the TEM (transmission electron microscope, Hitachi H-9000) confirmed that multi-layer carbon nanotubes of 10 nm to 50 nm were produced.

The above purity of the nanotubes was obtained in such a manner that the area ratio of the nanotubes against the fullerenes and the other materials (graphite and amorphous carbon, etc.) was calculated on the basis of the plural SEM photographs of the carbon material collected from arbitrary places (deposits on the electrode), and the calculated area ratio was converted into the equivalent volume ratio (same in the examples hereunder and the comparison example).

Example 2

The example 2 took on the same condition as the example 1, except that the electrode 11a (the electrode with the diameter of 5 mm) served as the anode and the power supply employed the direct current (200 Volts, 70 Amperes), and produced nanotubes and fullerenes. The weight of the carbon material deposited on the electrode with the diameter of 15 mm after discharge was found 1.385 grams. And, the purity of the nanotubes was 75~90%.

The result collected the carbon material deposited on the inner face of the vacuum chamber 10 in the production under the above condition, and extracted the fullerenes from the collected carbon material by using benzene. The experiment was carried out to vary the pressure inside the vacuum chamber 10 within 1.3 kPa to 93.1 kPa, and confirmed to produce the nanotubes and fullerenes under any pressure of the range.

Example 3

The example 3 took on the same condition as the example 2, except that the electrode 11a (the electrode with the outside diameter of 5 mm) was used as the anode, a cylindrical hole with the diameter 2 mm was bored on the electrode face of the electrode 11a, and in the hole mixed powder was filled which contained nickel powder 3 parts by weight, yttrium powder 1 part by weight, and carbon powder 2 parts by weight, and produced nanotubes and fullerenes. The result obtained 312 mg of the carbon material, and confirmed production of single-walled carbon nanotubes with the diameter 1 nm to 2 nm by the TEM observation. The purity of the nanotubes was 60 to 85%.

Example 4

The example 4 took on the same condition as the example 1, except that kerosene was used as the carboniferous material, and produced nanotubes and fullerenes. The result found that the weight of the carbon material deposited on the electrode 11b (electrode of the outside diameter 15 mm) after discharge was 217 mg. The purity of the nanotubes was 60% to 80%. The observations of the produced carbon material by the SEM and the TEM confirmed production of multi-walled carbon nanotubes.

Comparison Example

Figure 3:
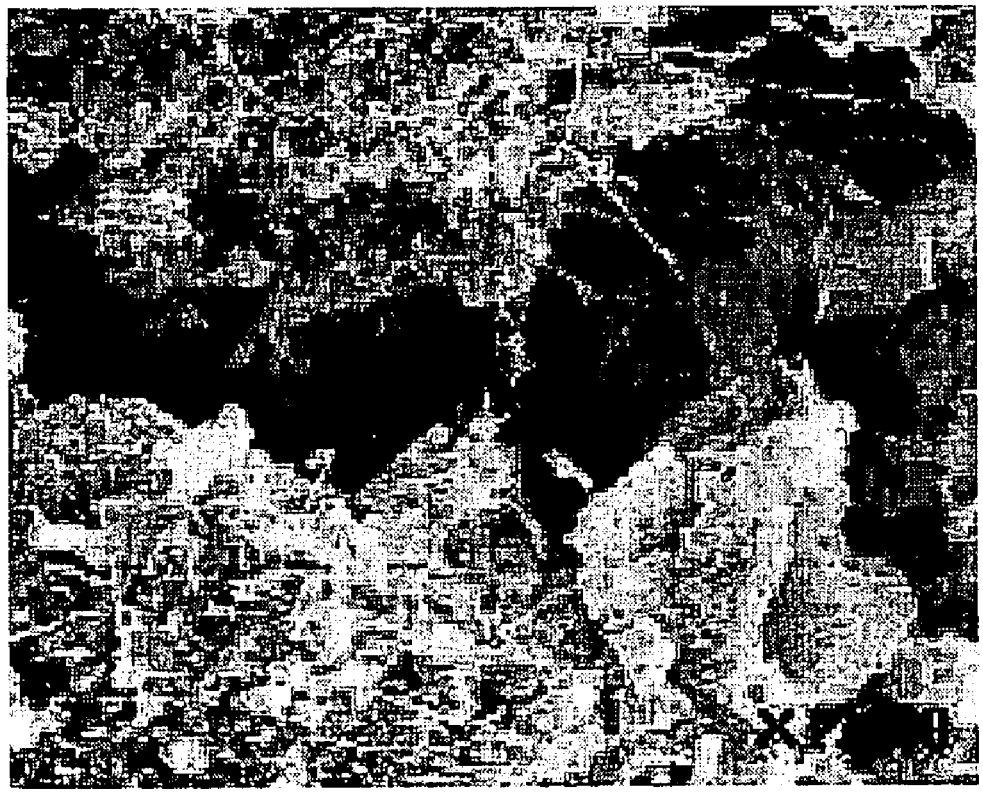
FIG. 3 is an SEM photograph of a carbon material that was attained by a comparison example.

The comparison example took on the same condition as the example 1, except that a helium gas was supplied into the vacuum chamber 10 without using the carboniferous material, and the pressure during manufacturing was set to 66.5 kPa, and produced nanotubes and fullerenes. The result found that the weight of the carbon material deposited on the electrode 11b (electrode of the outside diameter 15 mm) after discharge was 9.4 mg. The result of the SEM observation of the produced carbon material confirmed that several kinds of materials such as graphite and amorphous carbon and the like, the materials except for the nanotubes and fullerenes, were produced in abundance, which is clearly illustrated by the SEM photo (magnified 13000 times) in FIG. 3. The purity of the nanotubes was 45% to 60%.

From the results of the examples 1 through 4 and the comparison example as mentioned above, the application of the manufacturing device and the manufacturing method according to the present invention proves not only to increase the produced quantity of the carbon material but to enhance the purity of the nanotubes. Further, as illustrated in the example 3, to bring catalytic compositions into coexistence during manufacturing proves that single-walled carbon nanotubes are produced selectively.

As mentioned above, the manufacturing device and the manufacturing method according to the invention enable mass production of nanotubes and/or fullerenes with high purity, which proves that the industrial availability is very high.

The entire disclosure of Japanese Patent Application No. 2000-163489 filed on May 31, 2000 including specification, claims, drawings and abstract is incorporated herein by reference in its entirety.

What is claimed is:

1. A method of manufacturing single-walled carbon nanotubes comprising the steps of:
   reducing the pressure inside a system to 1.3 Pa or lower;
   when the pressure inside the system is 1.3 Pa or lower, initiating supply of a carboniferous liquid state material comprising a metallic catalyst, wherein the pressure inside the system is raised to at least 39.9 kPa;
   generating arc discharges;
   supplying the carboniferous liquid state material in discharge plasma created by the arc discharges; and
   disintegrating or exciting the carboniferous liquid state material to produce the single-walled carbon nanotubes.

2. A method of manufacturing single-walled carbon nanotubes according to claim 1, wherein the carboniferous liquid state material is an organic solvent.

3. A method of manufacturing single-walled carbon nanotubes according to claim 1, wherein the carboniferous liquid state material is any of a petroleum liquid, mineral oil, and fatty acid ester.

4. A method of manufacturing single-walled carbon nanotubes according to claim 1, wherein the metallic catalyst is iron, nickel and/or yttrium.

5. A method of manufacturing single-walled carbon nanotubes according to claim 1, wherein the metallic catalyst is yttrium.

6. A method of manufacturing single-walled carbon nanotubes according to claim 1, wherein the pressure inside the system is raised to 39.9 kPa to 79.8 kPa.

7. A method of manufacturing single-walled carbon nanotubes according to claim 1, wherein the carboniferous liquid state material is supplied from a raw material supply unit that is heated with a heater.

8. A method of manufacturing single-walled carbon nanotubes according to claim 1, wherein the carboniferous liquid state material is supplied to the discharge plasma by spraying as a mist.

9. A method of manufacturing carbon nanotubes comprising the steps of:
   reducing the pressure inside a system to 1.3 Pa or lower;
   when the pressure inside the system is 1.3 Pa or lower, initiating supply of a carboniferous liquid state materials, wherein the pressure inside the system is raised to at least 39.9 kPa;
   generating arc discharges;
   supplying the carboniferous liquid state material in discharge plasma created by the arc discharges; and
   disintegrating or exciting the carboniferous liquid state material to produce the carbon nanotubes.

10. A method of manufacturing carbon nanotubes according to claim 9, wherein the carboniferous liquid state material is an organic solvent.

11. A method of manufacturing carbon nanotubes according to claim 9, wherein the carboniferous liquid state material is any of a petroleum liquid, mineral oil, and fatty acid ester.

12. A method of manufacturing carbon nanotubes according to claim 9, wherein the arc discharges are generated from tungsten electrodes.

13. A method of manufacturing carbon nanotubes according to claim 9, wherein the arc discharges are generated by contact arc processing.

14. A method of manufacturing carbon nanotubes according to claim 9, wherein the carboniferous liquid state material is supplied from a raw material supply unit that is heated with a heater.

15. A method of manufacturing carbon nanotubes according to claim 9, wherein the carboniferous liquid state material is supplied to the discharge plasma by spraying as a mist.

* * * * *